US012716354B2

(12) United States Patent
Hou et al.

(10) Patent No.: US 12,716,354 B2
(45) Date of Patent: Aug. 25, 2026

(54) GEL PARTICLE-CONTAINING DISCONTINUOUS PHASE SEEPAGE EXPERIMENTAL APPARATUS AND CRITICAL PRESSURE DETERMINATION METHOD

(71) Applicant: CHINA UNIVERSITY OF PETROLEUM (EAST CHINA), Qingdao (CN)

(72) Inventors: Jian Hou, Qingdao (CN); Bei Wei, Qingdao (CN); Yongsheng Liu, Qingdao (CN); Kang Zhou, Qingdao (CN); Qingjun Du, Qingdao (CN); Yongge Liu, Qingdao (CN); Ermeng Zhao, Qingdao (CN); Dejun Wu, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 563 days.

(21) Appl. No.: 18/338,767

(22) Filed: Jul. 28, 2023

(65) Prior Publication Data

US 2024/0183270 A1 Jun. 6, 2024

(30) Foreign Application Priority Data

Nov. 30, 2022 (CN) ........................ 202211525372.7

(51) Int. Cl.
*E21B 49/00* (2006.01)
*B01L 3/00* (2006.01)
*G01N 11/08* (2006.01)

(52) U.S. Cl.
CPC ...... *E21B 49/008* (2013.01); *B01L 3/502715* (2013.01); *B01L 3/502746* (2013.01); *G01N 11/08* (2013.01); *B01L 2200/143* (2013.01)

(58) Field of Classification Search
CPC ............ E21B 49/008; B01L 3/502715; B01L 3/502746; B01L 2200/143; G01N 11/08
See application file for complete search history.

(56) References Cited

U.S. PATENT DOCUMENTS 4,478,071 A * 10/1984 Lecacheux ............ G01N 30/62 73/54.09
2016/0061701 A1* 3/2016 Amanullah ............. G01N 3/08 73/818

FOREIGN PATENT DOCUMENTS

CN 113791016 A * 12/2001 ............ G01N 13/04

OTHER PUBLICATIONS

CN113791016 English translation.*

* cited by examiner

*Primary Examiner* — Xin Y Zhong
(74) *Attorney, Agent, or Firm* — CBM PATENT CONSULTING, LLC

(57) ABSTRACT

A gel particle-containing discontinuous phase seepage experimental apparatus includes a micro-liquid volume injection system, a pressure acquisition and transmission system, a microscopic observation system, and an in-micro-channel particle screening and transfer system. According to the established discontinuous phase seepage experimental apparatus, particle sizes of gel particles are accurately screened by using a customized microfluidic chip, and transfer forms, existing states, pressure fluctuations, and the like of gel particles in a single-channel microfluidic chip under the conditions of different sizes, different elastic modulus, and different quantities are monitored in real-time by using a high-precision pressure sensing system and a microscopic observation system.

10 Claims, 4 Drawing Sheets

GEL PARTICLE-CONTAINING DISCONTINUOUS PHASE SEEPAGE EXPERIMENTAL APPARATUS AND CRITICAL PRESSURE DETERMINATION METHOD

CROSS-REFERENCE TO RELATED APPLICATIONS

This application claims priority to Chinese Patent Application Ser. No. CN2022115253727 filed on 30 Nov. 2022.

FIELD OF THE INVENTION

The present disclosure relates to the technical field of oil and gas field development engineering, and specifically, to a gel particle-containing discontinuous phase seepage experimental apparatus and a critical pressure determination method.

BACKGROUND OF THE INVENTION

After long-term waterflooding or polymer flooding, reservoir heterogeneity is very serious. Gel particle-containing heterogeneous compound flooding is an effective method for further enhancing oil recovery. Gel particles can temporarily block a high-permeability channel, causing liquid flow to divert from a high-permeability area to a low-permeability area, so as to promote balanced displacement of reservoirs. The local pressure gradually increases after the gel particles block the high-permeability channel, and then the gel particles deform and pass through the channel after the critical passing pressure is reached. The characteristics of discontinuous phase seepage of blocking—deformation transfer—blocking can effectively displace the remaining crude oil in the reservoir formation. However, at present, most of the studies on the microscopic seepage of gel particles focus on the transfer form of gel particles in microchannels, and few studies have quantitatively analyzed a relationship between the critical passing pressure of gel particles and a throat radius under the conditions of different elastic modulus, different concentrations, and different particle sizes. Therefore, it is necessary to establish a gel particle-containing discontinuous phase seepage microscopic experimental apparatus and a critical pressure determination method, in order to quantitatively study the seepage mechanism of gel particles in microchannels under different conditions and to quantitatively analyze various factors, so as to provide input parameters and a basic theoretical understanding for macroscopic seepage experiments and simulations.

SUMMARY OF THE INVENTION

In view of the deficiencies in the prior art, the present disclosure provides a gel particle-containing discontinuous phase seepage experimental apparatus.

In order to analyze various factors, in the present disclosure, a microfluidic experimental apparatus needs to be established to monitor pressure fluctuations generated by different types and quantities of gel particles in a single channel, and a certain relationship between various factors and the pressure fluctuations is established, so as to obtain a chart of a relationship between the critical passing pressure generated by the gel particles passing through a throat under the conditions of different elastic modulus and different quantities and a confinement ratio (a ratio of gel particles to a throat radius), and determine a limit at which the gel particles break.

The present disclosure further provides a critical pressure determination method implemented through the foregoing gel particle-containing discontinuous phase seepage experimental apparatus.

The present disclosure adopts the following technical solutions.

A gel particle-containing discontinuous phase seepage experimental apparatus includes a micro-liquid volume injection system, a pressure acquisition and transmission system, a microscopic observation system, and an in-microchannel particle screening and transfer system.

The micro-liquid volume injection system is configured to inject different types of gel particle solutions; the pressure acquisition and transmission system is configured to monitor pressure fluctuation features of gel particles transferring in and blocking a microchannel; the microscopic observation system is configured to visually study a transfer state and a blockage mode of the gel particles in the microchannel; and the in-microchannel particle screening and transfer system is configured to accurately screen out target gel particles.

According to the present disclosure, preferably, the micro-liquid volume injection system includes a micro-injection pump, a micro-injector, and a pipeline.

The micro-injector is matched with the micro-injection pump and is fixed on the micro-injection pump, and a liquid in the micro-injector is pumped into the in-microchannel particle screening and transfer system via the pipeline by using the micro-injection pump.

According to the present disclosure, preferably, the pressure acquisition and transmission system includes a T-shaped pipe connector, a pressure sensor, a controller, a communication module, and a computer. The T-shaped pipe connector, the controller, the communication module, and the computer are connected successively.

The T-shaped pipe connector is connected into the pipeline, and when the fluid passes through the T-shaped pipe connector, the internal pressure of a pipe is sensed by the pressure sensor through the T-shaped connector, then data acquisition and control is performed by the controller, and finally the communication module communicates with the computer for data transmission.

According to the present disclosure, preferably, the microscopic observation system includes a high-speed camera and a microscope.

The observed target gel particles are first captured by using the microscope, and subsequently, blockage and transfer forms of the target gel particles in the microchannel are observed by using the high-speed camera.

According to the present disclosure, preferably, the in-microchannel particle transfer system includes single-channel microfluidic chips with different structures.

According to the present disclosure, preferably, the single-channel microfluidic chip includes a gel particle injection port, a gel particle screening port, a waste liquid discharge port, an adjustable valve, a continuous phase injection port, a main transfer microchannel, an S-shaped channel, a convergent channel, a narrow throat, and a gel particle discharge port.

The gel particle injection port and the waste liquid discharge port are located on the same straight line, and a channel where the gel particle screening port is located is perpendicular to a communication channel between the gel particle injection port and the waste liquid discharge port; the main transfer microchannel forms an included angle of 125°-150° with the communication channel between the gel particle injection port and the waste liquid discharge port, a channel where the continuous phase injection port is located is vertically communicated with a main channel, and the main transfer microchannel, the S-shaped channel, the convergent channel, the narrow throat, and the gel particle discharge port are communicated successively.

The adjustable valve is located at the leftmost end of the main transfer microchannel, and the communication between a screening channel and a transfer channel is controlled through the adjustable valve.

According to the present disclosure, preferably, the micro-injection pump includes a constant flow micro-injection pump and a constant pressure micro-injection pump that are respectively configured to set a specific flow rate and specific injection pressure.

According to the present disclosure, the material of the pipeline is polytetrafluoroethylene, a fluorinated ethylene propylene copolymer, or a Tygon silica gel, and the inner diameter of the pipeline is 0.039-2.54 mm.

According to the present disclosure, preferably, the material of the single-channel microfluidic chip is poly(methyl methacrylate) (PMMA) or polydimethylsiloxane, and the thickness of the single-channel microfluidic chip is 0.5-1.5 cm.

According to the present disclosure, preferably, the micro-liquid volume injection system further includes a filter that is connected to the micro-injector and configured to filter out large particulate impurities from the solution.

A critical pressure determination method implemented through the foregoing gel particle-containing discontinuous phase seepage experimental apparatus includes the following steps:

- monitoring pressure fluctuations generated by different types and quantities of gel particles in a single channel;
- establishing a relationship between the critical pressure generated by the gel particles passing through a throat under the conditions of different elastic modulus and different concentrations and a confinement ratio, and determining a limit at which the gel particles break; and
- establishing a model for quantitatively characterizing gel particles in deforming and passing through the throat by taking into account factors such as the critical pressure and elastic modulus of the gel particles deforming and passing through the throat, a radius of the gel particle, and a radius of the throat.

A critical pressure determination method implemented through the foregoing gel particle-containing discontinuous phase seepage experimental apparatus includes the following steps:

(1) injecting a continuous phase fluid of a micro-injector for screening gel particles into a single-channel microfluidic chip through a gel particle screening port by using a third micro-injection pump, saturating the continuous phase fluid in the whole single-channel microfluidic chip, and closing an adjustable valve;

(2) injecting spherical gel particles from a micro-injector into a gel particle injection port by using a first micro-injection pump at an injection flow rate of 0.1-2 μL/min;

(3) slowly opening the adjustable valve when target gel particles are observed, quickly driving the target gel particles into a main transfer microchannel by adjusting the flow rate of the third micro-injection pump, and closing the adjustable valve at the same time, so that the target gel particles transfer along the main transfer microchannel;

(4) injecting a displacing phase fluid in a micro-injector for injecting the displacing phase fluid through a continuous phase injection port by using a second micro-injection pump at an injection flow rate of 0.1-10 μL/min to push the target gel particles to pass through an S-shaped channel to a convergent channel; and (5) acquiring a transfer form of the particles in real-time by using a high-speed camera and a microscope, and monitoring pressure changes of the spherical gel particles passing through a narrow throat by a pressure sensor to determine the critical pressure, the critical pressure referring to the maximum pressure at which the spherical gel particles can deform and pass through the narrow throat.

Further, preferably, the model for quantitatively characterizing gel particles in deforming and passing through the throat is represented by formula (I):

$$p_c = l_0 G\left[a\left(1-\frac{R_t}{R_e}\right)+b\frac{R_e^2}{R_t^2}\right]+cp_0. \tag{I}$$

In formula (I), $p_c$ is the critical pressure of the gel particles deforming and passing through the throat, $l_0$ is a reference length taking the radius of the throat, G is the elastic modulus, $R_e$ is the radius of the gel particle, $R_t$ is the radius of the throat and $$\frac{R_e}{R_t} \geq 1,$$

$p_0$ is reference pressure taking the atmospheric pressure, and a, b, and c are constants.

The present disclosure has the following beneficial effects.

1. Through the single-channel microfluidic chip of the present disclosure, the target gel particles in the microchannel can be accurately screened out.
2. In the present disclosure, through microfluidic experiments, a chart of the relationship between the critical passing pressure generated by the gel particles passing through the throat under the conditions of different elastic modulus and different particle sizes and the confinement ratio can be obtained, and the model for quantitatively characterizing gel particles in deforming and passing through is established.
3. The present disclosure is implemented under visual conditions, a seepage form of the gel particles in the microchannel can be observed in real-time, and the chip used in the experiments can be reused, reducing the cost of the experiment.

In the figures, 1: micro-injector for storing gel particles, 2: micro-injector for injecting a displacing phase fluid, 3: micro-injector for screening gel particles, 4: first micro-injection pump, 5: second micro-injection pump, 6: third micro-injection pump, 7: pipeline, 8: single-channel microfluidic chip, 9: end solution collector, 10: T-shaped pipe connector, 11: controller, 12: high-speed camera, 13: microscope, 14: computer, 15: filter, 16: gel particle injection port, 17: gel particle screening port, 18: waste liquid discharge port, 19: adjustable valve, 20: continuous phase injection port, 21: S-shaped channel, 22: convergent channel, 23: narrow throat, 24: gel particle discharge port, and 25: main transfer microchannel.

DETAILED DESCRIPTION OF THE EMBODIMENTS

The present disclosure will be further described with the drawings and embodiments, but the present disclosure is not limited to the described embodiments.

Embodiment 1

A gel particle-containing discontinuous phase seepage experimental apparatus includes a micro-liquid volume injection system, a pressure acquisition and transmission system, a microscopic observation system, and an in-microchannel particle screening and transfer system.

The micro-liquid volume injection system is configured to inject different types of gel particle solutions; the pressure acquisition and transmission system is configured to monitor pressure fluctuation features of gel particles transferring in and blocking a microchannel; the microscopic observation system is configured to visually study a transfer state and a blockage mode of the gel particles in the microchannel; and the in-microchannel particle screening and transfer system is configured to accurately screen out target gel particles.

According to the discontinuous phase seepage experimental apparatus established in the present disclosure, particles sizes of the gel particles are accurately screened by using a customized microfluidic chip, and transfer forms, existence states, pressure fluctuations, and the like of the gel particles in a single-channel microfluidic chip 8 under the conditions of different particle sizes, different elastic modulus, and different quantities are monitored in real-time by using a high-precision pressure sensing system and the microscopic observation system. Transfer change features of the gel particles in a pore throat may be quantitatively analyzed according to obtained critical pressure changes of the gel particles passing through a single throat under different conditions, and a model for characterizing the deformation and transfer of the gel particles is established. The established model for characterizing deformation and transfer of the gel particles has important guiding significance for studying the seepage mechanism of the gel particles in a porous medium and an optimal matching relationship between the particle size and the pore throat size.

Embodiment 2

Figure 1:
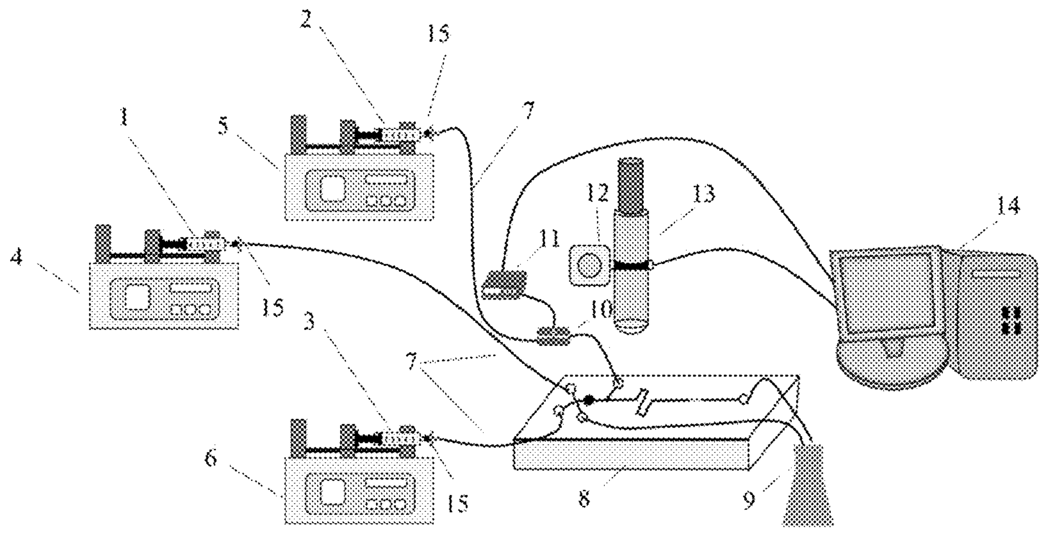
FIG. 1 is a schematic diagram of a gel particle-containing discontinuous phase seepage experimental apparatus of the present disclosure.

Compared to Embodiment 1, a gel particle-containing discontinuous phase seepage experimental apparatus, as shown in FIG. 1, this embodiment has the following differences.

A micro-liquid volume injection system includes a micro-injection pump, a micro-injector, a pipe valve, and a pipeline 7 (a PTFE conduit with an outer diameter of ⅛ in and an inner diameter of 1/16 in).

The micro-injector is matched with the micro-injection pump and is fixed on the micro-injection pump, and a liquid in the micro-injector is pumped into the in-microchannel particle screening and transfer system via the pipeline 7 by using the micro-injection pump.

A pressure acquisition and transmission system includes a T-shaped pipe connector 10, a pressure sensor, a controller 11, a communication module, and a computer 14. The T-shaped pipe connector 10, the controller 11, the communication module, and the computer 14 are connected successively.

The T-shaped pipe connector 10 is connected into the pipeline 7, and when the fluid passes through the T-shaped pipe connector 10, the internal pressure of a pipe is sensed by the pressure sensor, then data acquisition through the T-shaped pipe connector 10, and data acquisition and control is performed by the controller 11 (can control at most 4 sensors), and finally the communication module communicates with the computer 14 for data transmission.

A microscopic observation system includes a high-speed camera 12 and a microscope 13.

The observed target gel particles are first captured by using the microscope 13, and subsequently, blockage and transfer forms of gel particles in a microchannel are carefully observed by using the high-speed camera 12.

An in-microchannel particle transfer system includes single-channel microfluidic chips 8 with different structures and an end solution collector 9.

In the present disclosure, a model for quantitatively characterizing gel particles in deforming and passing through is established according to factors such as the critical pressure and elastic moduli of the gel particles deforming and passing through a throat under different conditions, a ratio of particle size to throat size, and the interfacial tension.

Figure 2:
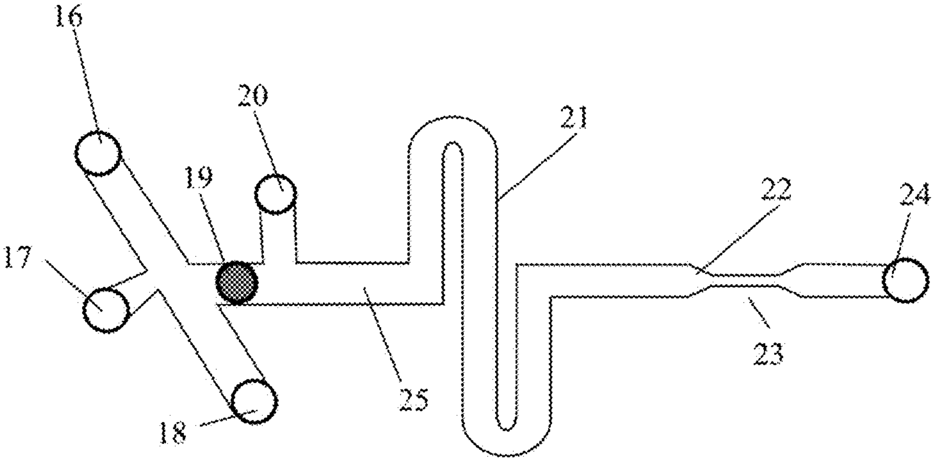
FIG. 2 is a schematic diagram of an internal structure of a single-channel microfluidic chip of the present disclosure.
Figure 3:
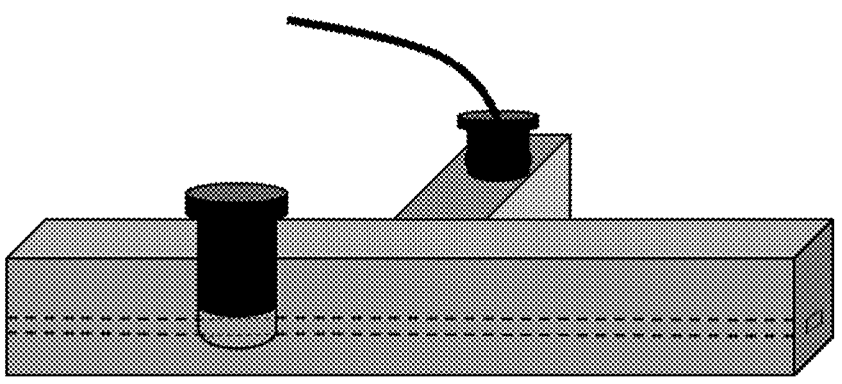
FIG. 3 is a schematic diagram of an adjustable valve of the present disclosure.

As shown in FIG. 2, the single-channel microfluidic chip 8 includes a gel particle injection port 16, a gel particle screening port 17, a waste liquid discharge port 18, an adjustable valve 19, a continuous phase injection port 20, a main transfer microchannel 25, an S-shaped channel 21, a convergent channel 22, a narrow throat 23, and a gel particle discharge port 24. FIG. 3 is a schematic three-dimensional diagram of the adjustable valve 19.

The gel particle injection port 16 and the waste liquid discharge port 18 are located on the same straight line, and a channel where the gel particle screening port 17 is located is perpendicular to a communication channel between the gel particle injection port 16 and the waste liquid discharge port 18; the main transfer microchannel 25 forms an included angle of 125°-150° (such as 135°) with the communication channel between the gel particle injection port 16 and the waste liquid discharge port 18, a channel where the continuous phase injection port 20 is vertically communicated with a main channel, and the main transfer microchannel 25, the S-shaped channel 21, the convergent channel 22, the narrow throat 23, and the gel particle discharge port are communicated sequentially.

The adjustable valve 19 is located at the leftmost end of the main transfer microchannel 25, and the communication between a screening channel and a transfer channel is controlled through the main transfer microchannel 25. The S-shaped channel 21 is configured to reduce interference with pressure fluctuations in the channel when the adjustable valve 19 is opened and closed.

A gel particle solution is injected through the gel particle injection port 16, a continuous phase fluid is injected through the gel particle screening port 17 to drive target gel particles into the main transfer microchannel 25, non-target gel particles are discharged through the waste liquid discharge port 18, a continuous phase fluid is injected through the continuous phase injection port 20, the gel particles transfer in the main transfer microchannel 25, the convergent channel 22 is configured to simulate a connection transition section of an actual pore throat, the narrow throat 23 is configured to simulate the actual throat, and a fluid in the microchannel is discharged through the gel particle discharge port 24.

The micro-injection pump includes a constant flow micro-injection pump and a constant pressure micro-injection pump that is configured to set a specific flow rate and specific injection pressure. An adjustable range of the flow rate of the constant flow micro-injection pump is 1-1800 mL/h. The maximum constant pressure of the constant pressure micro-injection pump is 300 kPa, with an accuracy of ±2%.

The micro-injector is matched with the micro-injection pump and is fixed on the micro-injection pump, with a measuring range of 10 mL, 25 mL, or 50 mL.

The material of the pipeline 7 is a polytetrafluoroethylene (PTFE), a fluorinated ethylene propylene (FEP) copolymer or a Tygon silica gel, and an inner diameter of the pipeline 7 is 0.039-2.54 mm.

The measuring range of the pressure sensor is 0-250 kPa, 0-800 kPa, or 0-1800 kPa, with an accuracy of 1%.

The maximum frame rate of the high-speed camera 12 is 224,000 fps, and an amplification factor of the microscope 13 may be 12.5×, 50×, 200× or 500× magnification with a maximum resolution of 0.1 μm.

The material of the single-channel microfluidic chip 8 is poly(methyl methacrylate) (PMMA) or polydimethylsiloxane (PDMS). The minimum width and depth of an etched microchannel of a single-channel microfluidic chip 8 made of PMMA are both 50 μm, the single-channel microfluidic chip 8 made of PMMA may be disassembled and washed. If the particle size of the gel particle is greater than 50 μm, the single-channel microfluidic chip 8 made of PMMA is recommended. The minimum width and depth of an etched microchannel of a single-channel microfluidic chip 8 made of PDMS are both 5 μm. The single-channel microfluidic chip 8 made of PDMS has a short service life and is a non-detachable integrated chip. If the particle size of the gel particle is 1-50 μm, the chip made of PDMS is recommended. The thickness of the single-channel microfluidic chip 8 is 0.5-1.5 cm.

The micro-liquid volume injection system further includes a filter 15 that is connected to the micro-injector and configured to filter out large particulate impurities from the solution. The filter 15 is used to prevent blockage of the single-channel microfluidic chip 8.

Embodiment 3

A critical pressure determination method implemented through the gel particle-containing discontinuous phase seepage experimental apparatus of Embodiment 2 includes the following steps:

pressure fluctuations generated by different types and quantities of gel particles in a single channel are monitored;

a relationship between the critical pressure generated by the gel particles passing through a throat under the conditions of different elastic modulus and different concentrations and a confinement ratio is established, and a limit at which the gel particles break is determined; and a model for quantitatively characterizing gel particles in deforming and passing through the throat is established by taking into account factors such as the critical pressure and elastic modulus of the gel particles deforming and passing through the throat, a radius of the gel particle, and a radius of the throat.

Figure 4:
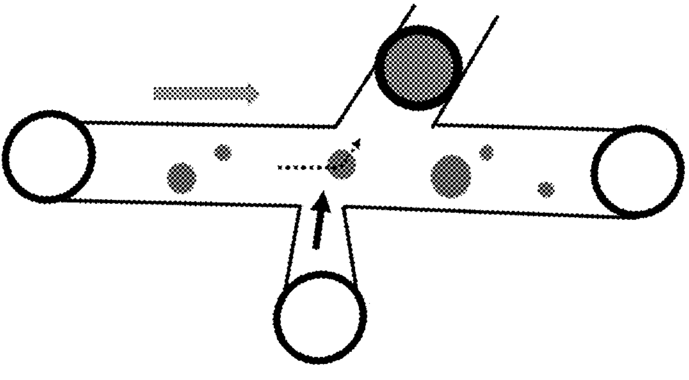
FIG. 4 is a schematic diagram of screening out of target gel particles.
Figure 5:
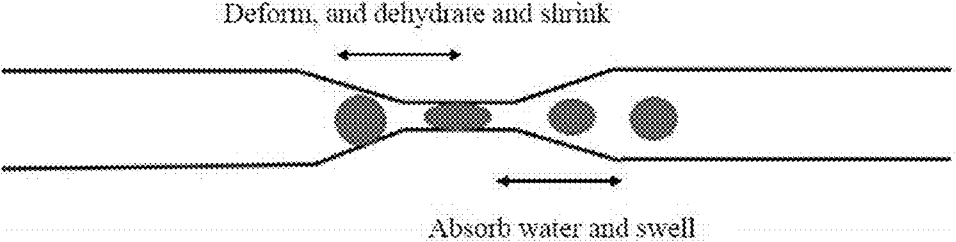
FIG. 5 is a schematic diagram of a morphological change of a single gel particle passing through a throat.
Figure 6:
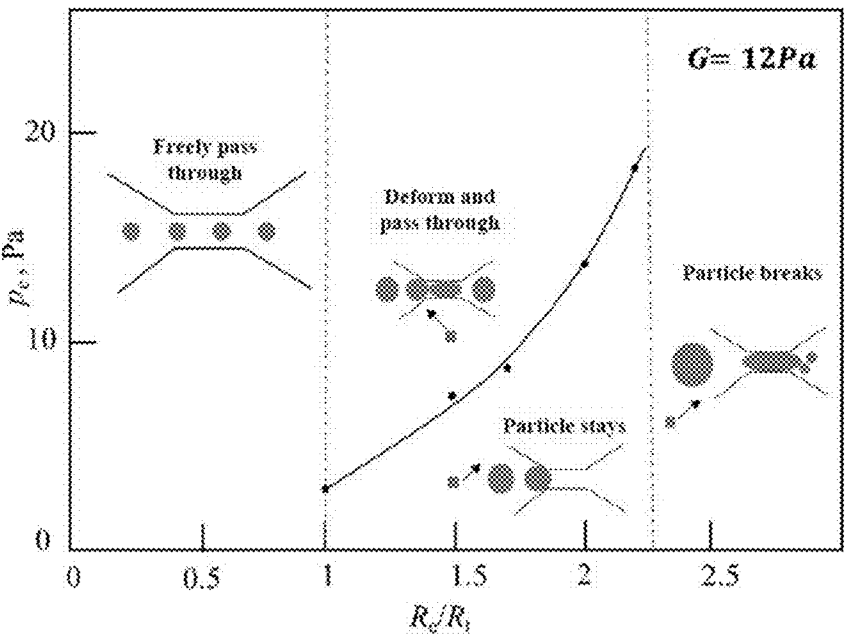
FIG. 6 is a schematic diagram of a relationship between the critical passing pressure $p_c$ of a single gel particle passing through a throat and a confinement ratio.

The method specifically includes the following steps:

(1) a continuous phase fluid in a micro-injector 3 for screening gel particles is injected into a single-channel microfluidic chip 8 through a gel particle screening port 17 by using a third micro-injection pump 6, the continuous phase fluid is saturated in the whole single-channel microfluidic chip 8, and an adjustable valve 19 is closed;

(2) spherical gel particles in a micro-injector 1 for storing gel particles are injected through a gel particle injection port 16 by using a first micro-injection pump 4 at a low injection flow rate of 0.1-2 μL/min, and the gel particles are diluted to an extremely dilute state;

(3) the adjustable valve 19 is slowly opened by only lifting up to a certain height when target gel particles are observed, the target gel particles are quickly driven into a main transfer microchannel 25 by adjusting a flow rate of the third micro-injection pump 3, the adjustable valve 19 is closed at the same time, so that the target gel particles transfer along the main transfer microchannel 25;

(4) a displacing phase fluid in a micro-injector 2 for injecting the displacing phase fluid is injected through a continuous phase injection port 20 by using a second micro-injection pump 5 at an injection flow rate B of 0.1-10 μL/min to push the target gel particles to pass through an S-shaped channel 21 to a convergent channel 22; and (5) a transfer form of the gel particles is acquired in real-time by using a high-speed camera 12 and a microscope 13, pressure changes of the spherical gel particles passing through a narrow throat 23 are monitored by a pressure sensor to determine the critical pressure, and the critical pressure is the maximum pressure at which the spherical gel particles are able to deform and pass through the narrow throat 23. If the particle size of the gel particle is larger than the diameter of the narrow throat 23, the gel particles transfer to the convergent channel 22, and as the gel particles move forward, the particles will be compressed and deformed to block the narrow throat 23. At this time, the injection pressure will continuously increase. When the injection pressure increases to a certain value, the gel particles will move forward to finally unblock the channel. The maximum pressure at which the particles are able to deform and pass through the narrow throat 23 is defined as the critical passing pressure. FIG. 4 is a schematic diagram of screening out of target gel particles. FIG. 5 is a schematic diagram of a morphological change of a single gel particle passing through a throat. FIG. 6 is a schematic chart of a relationship between the critical passing pressure $p_c$ of a single gel particle passing through a throat and a confinement ratio, and in the figures, the radius of the throat is 100 μm, and an elastic modulus of the gel particles is 12 Pa. Fitting is performed according to data shown in FIG. 6, and an established model for quantitatively characterizing gel particles in deforming and passing through the throat is represented by formula (I):

$$p_c = l_0 G\left[a\left(1 - \frac{R_t}{R_e}\right) + b\frac{R_e^2}{R_t^2}\right] + cp_0 \tag{I}$$

in formula (I), $p_c$ is the critical pressure of the gel particles deforming and passing through the throat, $l_0$ is a reference length taking the radius of the throat, G is the elastic modulus, $R_e$ is the radius of the gel particle, $R_t$ is the radius of the throat and $$\frac{R_e}{R_t} \geq 1,$$

$p_0$ is reference pressure taking the atmospheric pressure, and a, b, and c are constants.

Figure 7:
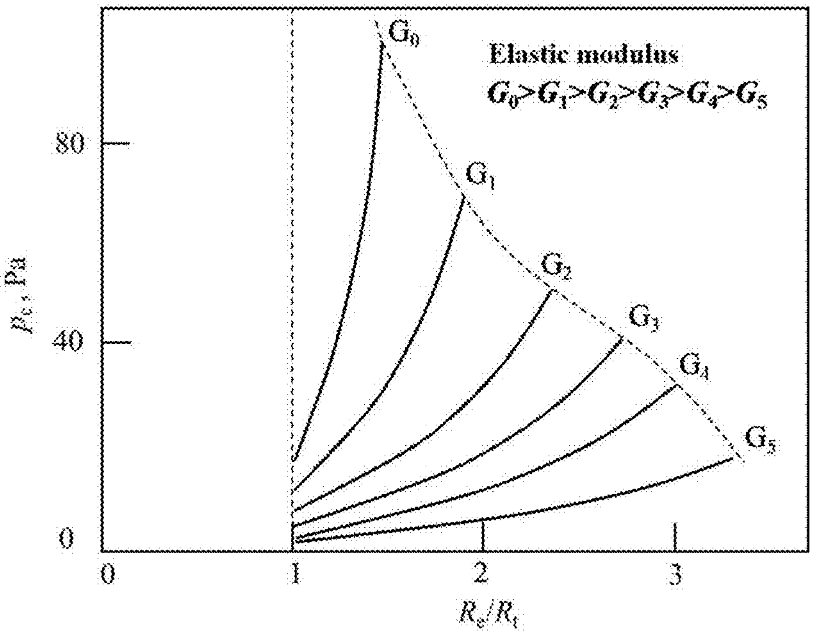
FIG. 7 is a schematic diagram of a relationship between the critical passing pressure $p_c$ of gel particles passing through a throat under the conditions of different elastic modulus and a confinement ratio.

$R^2$ is 0.9869, indicating that the established formula (I) fits the curve well. FIG. 7 is a schematic chart of a relationship between the critical passing pressure pc of gel particles passing through a throat under the condition of different elastic modulus and a confinement ratio. A relationship between parameters of the pressure, a ratio of the particle size to the throat diameter, and the elastic modulus may be obtained from the relationship chart, and a model for quantitatively characterizing a relationship between the critical passing pressure required by the gel particles deforming and passing through the throat at a certain flow rate and a confinement ratio (a ratio of the radius of the gel particle to the radius of the throat) as well as an elastic modulus, and a relationship between the breaking limit of the gel particles and the confinement ratio as well as the elastic modulus may be established.

All other embodiments obtained by those of ordinary skill in the art based on the embodiments of the present disclosure without involving any inventive effort shall fall within the scope of protection of the present disclosure.

What is claimed is:

1. A gel particle-containing discontinuous phase seepage experimental apparatus, comprising a micro-liquid volume injection system, a pressure acquisition and transmission system, a microscopic observation system, and an in-microchannel particle screening and transfer system;

the micro-liquid volume injection system being configured to inject different types of gel particle solutions; the pressure acquisition and transmission system being configured to monitor pressure fluctuation features of gel particles transferring in and blocking a microchannel; the microscopic observation system being configured to visually study a transfer state and a blockage mode of the gel particles in the microchannel; and the in-microchannel particle screening and transfer system being configured to accurately screen out target gel particles; wherein the in-microchannel particle screening and transfer system comprises single-channel microfluidic chips with different structures;

the single-channel microfluidic chip comprises a gel particle injection port, a gel particle screening port, a waste liquid discharge port, an adjustable valve, a continuous phase injection port, a main transfer microchannel, an S-shaped channel, a convergence channel, a narrow throat, and a gel particle discharge port;

the gel particle injection port and the waste liquid discharge port are located on the same straight line, and a channel where the gel particle screening port is located is perpendicular to a communication channel between the gel particle injection port and the waste liquid discharge port; the main transfer microchannel forms an included angle of 125°-150° with the communication channel between the gel particle injection port and the waste liquid discharge port, a channel where the continuous phase injection port is located is vertically communicated with a main channel, and the main transfer microchannel, the S-shaped channel, the convergent channel, the narrow throat, and the gel particle discharge port are communicated successively; and the adjustable valve is located at the leftmost end of the main transfer microchannel, and the communication between a screening channel and a transfer channel is controlled through the adjustable valve.

2. The gel particle-containing discontinuous phase seepage experimental apparatus according to claim 1, wherein the micro-liquid volume injection system comprises a micro-injection pump, a micro-injector, and a pipeline; and the micro-injector is matched with the micro-injection pump and is fixed on the micro-injection pump, and a liquid in the micro-injector is pumped into the in-microchannel particle screening and transfer system via the pipeline by using the micro-injection pump.

3. The gel particle-containing discontinuous phase seepage experimental apparatus according to claim 2, wherein the pressure acquisition and transmission system comprises a T-shaped pipe connector, a pressure sensor, a controller, a communication module, and a computer, the T-shaped pipe connector, the controller, the communication module, and the computer are connected successively; and the T-shaped pipe connector is connected into the pipeline, and when a fluid passes through the T-shaped pipe connector, an internal pressure of a pipe is sensed by the pressure sensor through the T-shaped connector, then data acquisition and control is performed by the controller, and finally the communication module communicates with the computer for data transmission.

4. The gel particle-containing discontinuous phase seepage experimental apparatus according to claim 3, wherein the microscopic observation system comprises a high-speed camera and a microscope; and the observed target gel particles are first captured by using the microscope, and subsequently, blockage and transfer forms of the target gel particles in the microchannel are observed by using the high-speed camera.

5. The gel particle-containing discontinuous phase seepage experimental apparatus according to claim 1, wherein the micro-injection pump comprises a constant flow micro-injection pump and a constant pressure micro-injection pump that are respectively configured to set a specific flow rate and specific injection pressure.

6. The gel particle-containing discontinuous phase seepage experimental apparatus according to claim 1, wherein the material of the pipeline is a polytetrafluoroethylene, a fluorinated ethylene propylene copolymer or a Tygon silica gel, and an inner diameter of the pipeline is 0.039-2.54 mm.

7. The gel particle-containing discontinuous phase seepage experimental apparatus according to claim 1, wherein the material of the single-channel microfluidic chip is poly (methyl methacrylate) or polydimethylsiloxane, and the thickness of the single-channel microfluidic chip is 0.5-1.5 cm.

8. The gel particle-containing discontinuous phase seepage experimental apparatus according to claim 1, wherein the micro-injection system further comprises a filter that is connected to the micro-injector and configured to filter out large particulate impurities from the solution.

9. A critical pressure determination method implemented through the gel particle-containing discontinuous phase seepage experimental apparatus according to claim 5, comprising the following steps:

(i) injecting a continuous phase fluid in a micro-injector for screening gel particles into a single-channel microfluidic chip through a gel particle screening port by using a third micro-injection pump, saturating the continuous phase fluid in the whole single-channel microfluidic chip, and closing an adjustable valve;

(ii) injecting spherical gel particles from a micro-injector for storing gel particles through a gel particle injection port by using a first micro-injection pump at an injection flow rate of 0.1-2 μL/min;

(iii) slowly opening the adjustable valve when target gel particles are observed, quickly driving the target gel particles into a main transfer microchannel by adjusting the flow rate of the third micro-injection pump, and closing the adjustable valve at the same time, so that the target gel particles transfer along the main transfer microchannel;

(iv) injecting a displacing phase fluid in a micro-injector for injecting the displacing phase fluid through a continuous phase injection port by using a second micro-injection pump at an injection flow rate of 0.1-10 μL/min to push the target gel particles to pass through an S-shaped channel to a convergent channel; and (v) acquiring a transfer form of the gel particles in real-time by using a high-speed camera and a microscope, and monitoring pressure changes of the spherical gel particles passing through a narrow throat by a pressure sensor to determine the critical pressure, the critical pressure being the maximum pressure at which the spherical gel particles are able to deform and pass through the narrow throat.

10. The critical pressure determination method implemented through the gel particle-containing discontinuous phase seepage experimental apparatus according to claim 9, wherein the gel particles in deforming and passing through the narrow throat being represented by formula (I):

$$p_c = l_0 G\left[a\left(1 - \frac{R_t}{R_e}\right) + b\frac{R_e^2}{R_t^2}\right] + cp_0 \tag{I}$$

in formula (I), $p_c$ being the critical pressure of the gel particles deforming and passing through the throat, $l_0$ being a reference length taking a radius of the throat, G being an elastic modulus, $R_e$ being a radius of the gel particle, $R_t$ being the radius of the throat and $$\frac{R_e}{R_t} \geq 1,$$

$p_0$ being reference pressure taking the atmospheric pressure, and a, b, and c being constants.

* * * * *